Patented May 24, 1949

2,470,887

UNITED STATES PATENT OFFICE 2,470,887

METHOD OF TREATING CRACKED GASOLINE TO REMOVE METALS

Joseph A. Chenicek, Riverside, Ill., assignor to Universal Oil Products Company, Chicago, Ill., a corporation of Delaware No Drawing. Application April 16, 1947, Serial No. 741,936

9 Claims. (Cl. 196—23)

This invention relates to a novel method of treating organic substances in order to remove metals which catalyze oxidative deterioration of the organic substances.

While the present invention is applicable to the treatment of fats, edible oils, lubricating oils, rubber, etc., it is particularly applicable to the treatment of olefinic hydrocarbon distillates such as cracked or polymer gasolines.

One method of refining gasoline is the copper sweetening process, in which process the gasoline is contacted with a copper-containing reagent. As a result of this treatment, the sweetened gasoline usually contains relatively small amounts of copper compounds which have a catalytic effect on oxidation reactions occurring when the gasoline comes in contact with air. In addition, gasolines come in contact with various metals in the course of refining, storing and shipping operations and this may result in the gasoline containing minor amounts of such metals as copper, iron, cobalt, nickel, chromium, lead, etc., which have a detrimental effect on the stability of gasoline.

In one embodiment the present invention relates to a method of treating an organic substance to remove metals therefrom, which comprises contacting said organic substance with a reagent solution of an ortho-hydroxy aromatic aldehyde in an amino compound, and subsequently separating the organic substance reduced in metal content from reagent solution.

In a specific embodiment the present invention relates to a method of treating cracked gasoline to remove metals which catalyze oxidative deterioration, which comprises contacting the cracked gasoline with a reagent solution of salicylaldehyde in an amino compound, separating an upper phase comprising cracked gasoline reduced in metal content and a lower phase comprising reagent solution, and separately withdrawing said phases.

The reagent solution of the present invention comprises a solution of an ortho-hydroxy aromatic aldehyde in an amino compound. The preferred ortho-hydroxy aromatic aldehyde is salicylaldehyde, although it is understood that salicylaldehyde containing substituent groups which are not too strongly acidic may be employed. A particularly satisfactory substituted aldehyde is 2-hydroxy-3-methoxy benzaldehyde. Other alkoxy substituted salicylaldehydes include those in which the alkoxy radical comprises ethoxy, propoxy, butoxy, pentoxy, hexoxy, etc., although it is a general rule that methoxy and ethoxy substituted salicylaldehydes are preferred. It is understood that two or more alkoxy radicals may be attached to the same aromatic ring. Other suitable substituent groups attached to the aromatic ring or rings include alkyl, aralkyl, aryl, alkaryl, hydroxy, amino, monoalkylamino, dialkylamino, nitro, halo and particularly bromo, etc., radicals. Other ortho-hydroxy aromatic aldehydes include ortho-hydroxy napthaldehyde and ortho-hydroxy anthraldehyde, which may or may not be substituted in the same manner as hereinbefore set forth.

In accordance with the invention an ortho-hydroxy aromatic aldehyde as set forth above is dissolved in an excess of an amino compound. Particularly preferred amino compounds include alkylene polyamines and particularly ethylene diamine, propylene diamine, butylene diamine, amylene diamine, diethylene triamine, dipropylene triamine, dibutylene triamine, diamylene triamine, triethylene tetramine, tripropylene tetramine, tributylene tetramine, triamylene tetramine, tetraethylene pentamine, tetrapropylene pentamine, tetrabutylene pentamine, phenylene diamine, etc.

Other preferred amino compounds comprise amino hydroxy compounds including ethanolamine, diaminopropanol, diaminobutanol, aminomethylpropanediol, aminoethylpropanediol, aminopropylpropanediol, aminomethylbutanediol, aminoethylbutanediol, etc.

The amino compound should be used in excess over the ortho-hydroxy aromatic aldehyde and preferably in a substantial excess so that a clear homogeneous solution is obtained. This solution may be used as such or, when desired, it may be diluted in a suitable solvent such as water.

The process of the present invention is preferably effected at atmospheric temperature, although slightly elevated temperatures which generally will not be above about 200° F. may be employed. Sufficient pressure is utilized to maintain the reactants and gasoline in substantially liquid phase. The pressure may range from atmospheric to 200 pounds per square inch or more.

The process may be effected in any suitable manner wherein satisfactory contacting of the organic substance with the reagent solution is obtained and wherein provision is made for separating and recovering the desired products. The process may comprise either batch or continuous type operations. In a batch operation, the gasoline and reagent may be introduced into a chamber and suitably mixed therein, after which the products may be allowed to settle either in the same or different chambers. An upper gasoline layer will separate from a lower reagent solution layer. The upper gasoline layer, which will now be reduced in metal content, is separately withdrawn and may be utilized as desired. However, in a preferred embodiment of the invention, the upper gasoline layer is washed with water or other suitable solvent in which the gasoline is immiscible and in which the amino compound is soluble, in order to remove excess amino compound from the gasoline. The lower layer, which will comprise the reagent solution, may be reused in the process for treating additional gasoline. The reagent may be used for an exceedingly long period of time and, after it is finally inactivated, it may be discarded. When desired, however, the spent reagent solution may be distilled to recover the excess amino compound.

Continuous processes preferably comprise counter-current operations in which the gasoline and reagent solution are passed countercurrently to each other in a zone wherein the total mixture is maintained in liquid phase and wherein two liquid phases are allowed to form. The upper layer will comprise gasoline now substantially reduced in metal content and it may be withdrawn for use or treatment as hereinbefore set forth. The lower layer will comprise reagent solution and may be recycled for further use in the process. In place of countercurrent operations, concurrent operations employing baffle mixers, orifice plates, mixing nozzles, etc., may be used to effect the desired mixing, after which the mixture is allowed to settle and the separate phases withdrawn. It is understood that single or multiple stage operations may be employed in either the batch or continuous systems.

As hereinbefore set forth, the amino compound is used in excess and this may range from about 1.5 to about 20 molecular proportions of amino compound to ortho-hydroxy aromatic aldehyde. The volume per cent of reagent solution used to treat the cracked gasoline may range as low as 0.5 volume of reagent solution per volume of cracked gasoline but preferably will be within the range of from about 1.5 to about 10 volumes or more of reagent solution per volume of cracked gasoline.

Metals in gasoline not only serve to catalyze oxidative deterioration of the original gasoline, but also serve to catalyze oxidative deterioration of gasoline treated with a gum inhibitor. These gum inhibitors are well known and generally include various phenols, amines, aminophenols, as well as fractions of wood tar oil, etc. A particularly suitable gum inhibitor comprises N-N'-di-secondary-butyl-p-phenylene diamine. Another particularly suitable gum inhibitor comprises a mixture of a major proportion of N-n-butyl-p-aminophenol and a minor proportion of N-N'-di-n-butyl-p-phenylene diamine in an alcoholic solvent. These gum inhibitors are usually added to gasoline in concentrations of from about 0.001% to about 0.01% by weight.

The following examples are introduced to further illustrate the novelty and utility of the present invention without unduly limiting the same.

The following tests were conducted with a Pennsylvania cracked gasoline which had a blank induction period of 105 minutes. The induction period is determined by the oxygen bomb stability test which is a standard method of evaluating the storage stability of gasoline.

To show the deleterious effect of metal, copper in the form of copper oleate was added to a sample of the Pennsylvania cracked gasoline in an amount of 1 milligram of copper per liter of gasoline. Upon the addition of the copper, the induction period of the gasoline was reduced from 105 to 55 minutes.

To another sample of the Pennsylvania cracked gasoline, 0.005% by weight of a gum inhibitor comprising N-N'-di-secondary-butyl-p-phenylene diamine was added and the induction period of the gasoline was increased from 105 to 450 minutes. However, upon the addition of 1 milligram of copper per liter of gasoline, the induction period of the inhibited gasoline fell to 165 minutes.

The following examples illustrate the beneficial results obtained by treating different samples of the same Pennsylvania cracked gasoline containing copper with various reagent solutions of the present invention and then adding 0.005% by weight of the gum inhibitor hereinbefore set forth.

*Example I*

The Pennsylvania cracked gasoline containing 1 milligram of copper per liter of gasoline was washed with 10 volume per cent of a 10% by weight solution of salicylaldehyde in ethanolamine, followed by water washing, and finally inhibited with 0.005% by weight of the inhibitor. The gasoline so treated had an induction period of 375 minutes.

*Example II*

In this example the copper containing cracked gasoline was washed with a 10% by weight solution of salicylaldehyde in ethylene diamine, followed by water washing and addition of 0.005% by weight of gum inhibitor. The induction period of the gasoline was 315 minutes.

*Example III*

The reagent solution in this example was a 10% by weight solution of salicylaldehyde in diethylene triamine. The gasoline containing copper, after treatment with this solution and upon the addition of 0.005% by weight of the gum inhibitor, had an induction period of 430 minutes.

It will be noted that in all three of the above examples the deleterious effect of copper was offset by treating the gasoline with a reagent solution of an orthohydroxy aromatic aldehyde and an amino compound.

I claim as my invention:

1. A method of treating cracked gasoline to remove metals which catalyze oxidative deterioration, which comprises contacting the cracked gasoline with a reagent solution of an ortho-hydroxy aromatic aldehyde in an excess of an amino compound selected from the group consisting of alkylene polyamine and alkanol amines, and subsequently separating the cracked gasoline reduced in metal content from reagent solution.

2. A method of treating cracked gasoline to remove copper therefrom, which comprises contacting the cracked gasoline with a reagent solution of salicylaldehyde in an excess of an amino compound selected from the group consisting of alkylene polyamine and alkanol amine, separating an upper phase comprising cracked gasoline reduced in copper content and a lower phase comprising reagent solution, and separately withdrawing said phases.

3. The method of claim 2 further characterized in that said amino compound comprises ethylene diamine.

4. The method of claim 2 further characterized in that said amino compound comprises propylene diamine.

5. The method of claim 2 further characterized in that said amino compound comprises ethanol amine.

6. A method of treating cracked gasoline to remove copper therefrom, which comprises contacting the cracked gasoline with a reagent solution of an ortho-hydroxy aromatic aldehyde in a substantial excess of an amino compound selected from the group consisting of alkylene polyamine and alkanol amines, maintaining the gasoline and reagent solution in liquid phase, subsequently separating an upper layer comprising cracked gasoline reduced in copper content from a lower layer comprising reagent solution, and separately withdrawing said layers.

7. The method of claim 6 further characterized in that said amino compound comprises salicylaldehyde and ethylene diamine.

8. The method of claim 6 further characterized in that said reagent solution comprises salicylaldehyde and propylene diamine.

9. The method of claim 6 further characterized in that said reagent solution comprises salicylaldehyde and ethanol amine.

JOSEPH A. CHENICEK.

REFERENCES CITED

The following references are of record in the file of this patent:

UNITED STATES PATENTS

| Number | Name | Date |
|---|---|---|
| 2,189,850 | Whitner | Feb. 13, 1940 |
| 2,242,621 | Schutze et al. | May 20, 1941 |
| 2,302,352 | Schutze | Nov. 17, 1942 |
| 2,411,958 | Dietrich et al. | Dec. 3, 1946 |
| 2,411,959 | Dietrich et al. | Dec. 3, 1946 |